(12) United States Patent
Koneru et al.

(10) Patent No.: US 12,244,765 B2
(45) Date of Patent: *Mar. 4, 2025

(54) SYSTEMS AND METHODS FOR TRAINING A VIRTUAL ASSISTANT PLATFORM CONFIGURED TO ASSIST HUMAN AGENTS AT A CONTACT CENTER

(71) Applicant: KORE.AI, INC., Orlando, FL (US)

(72) Inventors: Rajkumar Koneru, Windermere, FL (US); Prasanna Kumar Arikala Gunalan, Hyderabad (IN); Rajavardhan Nalluri, Hyderabad (IN); Girish Ahankari, Hyderabad (IN); Thirupathi Bandam, Hyderabad (IN); Venkata Praveen Kumar Suvanam, Hyderabad (IN)

(73) Assignee: KORE.AI, INC., Orlando, FL (US)

( * ) Notice: Subject to any disclaimer, the term of this patent is extended or adjusted under 35 U.S.C. 154(b) by 287 days.

This patent is subject to a terminal disclaimer.

(21) Appl. No.: 18/077,836

(22) Filed: Dec. 8, 2022

(65) Prior Publication Data
US 2024/0195915 A1 Jun. 13, 2024

(51) Int. Cl.
*H04M 11/00* (2006.01)
*H04M 3/493* (2006.01)
*H04M 3/51* (2006.01)

(52) U.S. Cl.
CPC ....... *H04M 3/4936* (2013.01); *H04M 3/5175* (2013.01); *H04M 2203/403* (2013.01)

(58) Field of Classification Search
CPC .......................... H04M 3/4936; H04M 3/5175
See application file for complete search history.

(56) References Cited

U.S. PATENT DOCUMENTS

| | | | |
|---|---|---|---|
| 8,411,841 B2 | 4/2013 | Edwards et al. | |
| 8,438,089 B1 | 5/2013 | Wasserblat et al. | |
| 10,839,322 B2 | 11/2020 | Pattabhiraman et al. | |
| 11,342,051 B1 * | 5/2022 | Jain | G16H 10/60 |
| 11,516,158 B1 * | 11/2022 | Luzhnica | G06F 40/35 |
| 11,870,935 B1 * | 1/2024 | Sekar | H04M 3/5232 |
| 2017/0235740 A1 | 8/2017 | Seth et al. | |

(Continued)

*Primary Examiner* — Simon King
(74) *Attorney, Agent, or Firm* — Troutman Pepper Locke LLP

(57) ABSTRACT

A contact center server provides to an agent device one or more automated response recommendations determined by an executable virtual assistant platform to correspond to customer message data received from a customer device as part of conversation data. Further, the contact center server receives a selection of one of the automated response recommendations from the agent device and identifies agent response data to the customer message data transmitted from the agent device to the customer device. Further, the contact center server, using one or more classification models, determines when there is a change between the selected response recommendation and the identified agent response data. Further, the contact center server associates one or more tags to the identified agent response data in the conversation data when the determination indicates the change. Subsequently, the contact center server updates training of the executable virtual assistant platform based on the conversation data with the associated one or more tags.

30 Claims, 13 Drawing Sheets

(56) References Cited

U.S. PATENT DOCUMENTS

| | | |
|---|---|---|
| 2017/0344754 A1 | 11/2017 | Kumar et al. |
| 2018/0165723 A1 | 6/2018 | Wright et al. |
| 2019/0146647 A1* | 5/2019 | Ramchandran ......... G06F 40/35 715/758 |
| 2020/0106881 A1* | 4/2020 | Beaver .................... G06F 16/36 |
| 2022/0156298 A1 | 5/2022 | Mahmoud et al. |
| 2022/0383153 A1 | 12/2022 | Mahmoud et al. |

* cited by examiner

| S. No. | Message Type | Message | Expected Output |
|---|---|---|---|
| 1 | Response Recommendation | Sure, I will help you resolve the issue | Empathy added |
| | Agent Response Data | I am sorry you are facing this issue. I will help you resolve this as soon as possible | |
| 2 | Response Recommendation | I cannot process this request, as this is not a part of our customer service policy | Empathy added |
| | Agent Response Data | Apologies, I am afraid I cannot process this request, as this is not a part of our customer service policy | |
| 3 | Response Recommendation | Sorry, your account has been suspended temporarily. Please visit the nearest branch for further assistance | Rephrased |
| | Agent Response Data | I wish I have good news, but your account has been suspended temporarily. Please visit the nearest branch to get your issue resolved | |
| 4 | Response Recommendation | I am sorry you are facing this issue. I will help you in resolving the issue as soon as possible | Empathy deleted |
| | Agent Response Data | I will help you resolve the issue as soon as possible | |
| 5 | Response Recommendation | I can understand how difficult this must be to you | No change |
| | Agent Response Data | I can understand how difficult this must be to you | |

FIG. 2A

| S. No. | Message Type | Message | Expected Output |
|---|---|---|---|
| 1 | Response Recommendation | You want to book a flight from <city A> to <city B>, is that correct? | Intent added |
| 2 | Agent Response Data | You want to book flight from <city A> to <city B> and book hotel to stay a night at <city B>, is that correct? | Entity added |
| 2 | Response Recommendation | How many days you want to stay there? | |
| | Agent Response Data | How many days you want to stay in <city B>? | |
| 3 | Response Recommendation | For how many passengers you want to book flight tickets? | Intent deleted |
| | Agent Response Data | How many passengers are travelling? | |
| 4 | Response Recommendation | How many passengers are travelling to <city B>? | Entity deleted |
| | Agent Response Data | How many passengers are traveling? | |
| 5 | Response Recommendation | For how many passengers you want to book flight tickets from <city A> to <city B>? | Intent and entity deleted |
| | Agent Response Data | How many passengers are travelling? | |
| 6 | Response Recommendation | How many passengers are travelling? | No change |
| | Agent Response Data | How many passengers are traveling? | |

FIG. 2B

| S. No. | Message Type | Message | Expected Output |
|---|---|---|---|
| 1 | Response Recommendation | Hello | Greeting added |
| | Agent Response Data | Hello, good morning! | |
| 2 | Response Recommendation | Hi, good morning! | Small-talk added |
| | Agent Response Data | Hi, good morning! How can I help you? | |

FIG. 2C

| User | Message Data | Tag(s) | Response Recommendation(s) |
|---|---|---|---|
| Customer | Hi | Small Talk | Hello, good morning, how may I help you? ← 602 |
| Human Agent | Hello, good morning, how may I help you? ← 604 | Used as-is | |
| Customer | How to reset my modem? | Intent - Modem Reset | Okay, I will help you in resetting your modem. Please follow the below steps to reset the modem: power-on the modem → press and hold the reset button on the back side of the modem for 5 seconds ← 606 |
| Human Agent | Okay, I will help you in resetting your modem. Please follow the below steps to reset the modem: power-on the modem → press and hold the reset button on the back side of the modem for 5 seconds ← 608 | Used as-is | |
| Customer | Thanks for the help | | Thank you for contacting us, have a good day, bye. ← 610 |
| Human Agent | Thank you for contacting us, have a good day, bye. ← 612 | Used as-is | |

FIG. 6A

| User | Message Data | Tag(s) | Response Recommendation(s) |
|---|---|---|---|
| Customer | Hi | Small Talk | Hello, good morning, how may I help you? |
| Human Agent | Hello, good morning, how may I help you? | Used as-is | |
| Customer | I have a future plus modem, and I am not able to reset it. I am trying to reach an agent since yesterday. The long wait times are such a hassle. | Intent - Modem Reset | Okay, I will help you in resetting your modem. Please follow the below steps to reset your modem: power-on your modem → press and hold the reset button on the back side of the modem for 5 seconds |
| Human Agent | I am sorry to hear that. I will help you in resetting your modem. Please follow the below steps to reset your modem: power-on your modem → press and hold the reset button on the back side of the modem for 5 seconds | Empathy Added | |
| Customer | Thanks for the help. Initially, when I tried resetting, I did not press and hold the reset button for long enough. | | Thank you for contacting us, have a good day, bye. |
| Human Agent | Thank you for contacting us, have a good day, bye. | Used as-is | |

FIG. 6B

| User | Message Data | Tag(s) | Response Recommendation(s) |
|---|---|---|---|
| Customer | Hi | Small Talk | Hello, good morning, how may I help you? |
| Human Agent | Hello, good morning, how may I help you? | Used as-is | |
| Customer | I want to fly from Washington DC to New York on coming Saturday evening and spend a night there | Intent – Book Flight | Should I book a flight from Washington DC to New York on coming Saturday evening? |
| Human Agent | Should I book a flight from Washington DC to New York on coming Saturday evening and book a hotel for Saturday night in New York? | Intent Added | |
| Customer | Yes | Confirmation | |
| Human Agent | ......... | ......... | ......... |
| Customer | ......... | ......... | ......... |
| Human Agent | ......... | ......... | ......... |

FIG. 6C

| User | Message Data | Tag(s) | Response Recommendation(s) |
|---|---|---|---|
| Customer | Hi | Small Talk | Hello, good morning, how may I help you? |
| Human Agent | Hello, good morning, how may I help you? | Used as-is | |
| Customer | I want a medium cheese pizza with olives, tomatoes. umm.. make it two | Intent — Order Pizza | One medium cheese pizza with olives and tomatoes. Is that correct? |
| Human Agent | Two medium cheese pizzas with olives and tomatoes. Is that correct? | Entity Value Modified | |
| Customer | That's correct | Confirmation | |
| Human Agent | ......... | ......... | ......... |
| Customer | ......... | ......... | ......... |
| Human Agent | ......... | ......... | ......... |

FIG. 6D

| Output of the Empathy Detection Model | Output of the Intent and Entity Model | Output of the Small-Talk and Greeting Model | Tag(s) associated by the Tagging Engine to the Agent Response Data |
|---|---|---|---|
| No Change | No Change | No Change | Used as-is |
| Empathy Added | No Change | No Change | Empathy Added |
| No Change | Intent Added | No Change | Intent Added |
| No Change | Intent Added, Entity Added | No Change | Intent Added, Entity Added |
| Empathy Added | Entity Value Modified | No Change | Empathy Added, Entity Value Modified |

FIG. 7

SYSTEMS AND METHODS FOR TRAINING A VIRTUAL ASSISTANT PLATFORM CONFIGURED TO ASSIST HUMAN AGENTS AT A CONTACT CENTER

FIELD

This technology generally relates to contact centers and, more particularly, to methods, systems, and computer-readable media for improving customer service by monitoring real-time conversations between customers and human agents at a contact center and providing automated assistance to the human agents.

BACKGROUND

To assist human agents at contact centers to handle customer conversations effectively, several contact center technologies have been developed over the time. The emergence of artificial intelligence led to development and usage of machine learning (ML) based agent-assist models to help the human agents resolve customer queries by recommending relevant responses, knowledge articles, next best actions, and summarizing the conversations that the human agents may review and submit during after-call-work.

However, existing agent-assist models are not effective in handling complex conversations. Further, to improve the performance, existing agent-assist models require extensive training and manual feedback to be provided by one or more enterprise users such as, for example, human agents, supervisors, developers, or administrators. In one example, the developers have to manually look into performance insights of the agent-assist model and provide additional training.

Currently, mechanisms exist for collecting feedback based on actions performed by the human agents, such as accepting or rejecting one or more recommendations provided by the agent-assist model or selecting a like or a dislike option for the one or more recommendations provided by the agent-assist model. However, these actions provide limited feedback and insights to the contact centers regarding the performance of the agent-assist model.

Hence, there is a need for systems and methods to improve the recommendations provided to the human agents by improving the agent-assist models.

SUMMARY

In an example, the present disclosure relates to a method for monitoring real-time conversations between customers and human agents at a contact center and providing better recommendation data to the human agents. The method comprises providing to an agent device, recommendation data comprising one or more automated response recommendations determined by an executable virtual assistant platform to correspond to customer message data received from a customer device as part of conversation data. Further, a selection of one of the one or more automated response recommendations in the recommendation data is received from the agent device. Further, agent response data to the customer message data that is transmitted from the agent device to the customer device is identified in the conversation data. Further, using one or more classification models, determining when there is a change between the selected one of the one or more automated response recommendations in the recommendation data and the identified agent response data. Further, one or more tags are associated to the identified agent response data in the conversation data when the determination indicates the change. Subsequently, training of the executable virtual assistant platform is updated based on the conversation data with the associated one or more tags.

In another example, the present disclosure relates to a contact center server comprising one or more processors and a memory. The memory coupled to the one or more processors which are configured to execute programmed instructions stored in the memory to provide to an agent device, recommendation data comprising one or more automated response recommendations determined by an executable virtual assistant platform to correspond to customer message data received from a customer device as part of conversation data. Further, a selection of one of the one or more automated response recommendations in the recommendation data is received from the agent device. Further, agent response data to the customer message data that is transmitted from the agent device to the customer device is identified in the conversation data. Further, using one or more classification models, determining when there is a change between the selected one of the one or more automated response recommendations in the recommendation data and the identified agent response data. Further, one or more tags are associated to the identified agent response data in the conversation data when the determination indicates the change. Subsequently, training of the executable virtual assistant platform is updated based on the conversation data with the associated one or more tags.

In another example, the present disclosure relates to a non-transitory computer readable storage medium having stored thereon instructions which when executed by one or more processors, causes the one or more processors to provide to an agent device, recommendation data comprising one or more automated response recommendations determined by an executable virtual assistant platform to correspond to customer message data received from a customer device as part of conversation data. Further, a selection of one of the one or more automated response recommendations in the recommendation data is received from the agent device. Further, agent response data to the customer message data that is transmitted from the agent device to the customer device is identified in the conversation data. Further, using one or more classification models, determining when there is a change between the selected one of the one or more automated response recommendations in the recommendation data and the identified agent response data. Further, one or more tags are associated to the identified agent response data in the conversation data when the determination indicates the change. Subsequently, training of the executable virtual assistant platform is updated based on the conversation data with the associated one or more tags.

BRIEF DESCRIPTION OF THE DRAWINGS

FIG. 2A is a table of exemplary training data that may be used for training an empathy detection model illustrated in FIG. 1B.

FIG. 2B is a table of exemplary training data that may be used for training an intent and entity model illustrated in FIG. 1B.

FIG. 2C is a table of exemplary training data that may be used for training a small-talk and greeting model illustrated in FIG. 1B.

FIGS. 6A-6D are tables of exemplary conversations between customers and human agents, tags associated with messages of the conversations and agent-assist response recommendations.

FIG. 7 is a table of an exemplary association between outputs of the empathy detection model, the intent and entity model and the small-talk, and greeting model and tags associated by a tagging engine.

DETAILED DESCRIPTION

Examples of the present disclosure relate to contact centers and, more particularly, to one or more components, systems, computer-readable media and methods for improving agent assistance and customer service by monitoring real-time conversations between customers and human agents at a contact center. Contact center representatives (hereinafter referred to as "human agents") assist customers using internal applications, virtual assistants, knowledge bases, group chats, or the like. The human agents are provided with assistance during customer conversations using an agent-assist model. For example, the agent-assist model may assist a human agent by recommending actions to be taken and/or responses to be sent to a customer, based on an ongoing conversation between the human agent and the customer, such that the human agent may provide quick and efficient assistance to the customer.

Figure 1A:
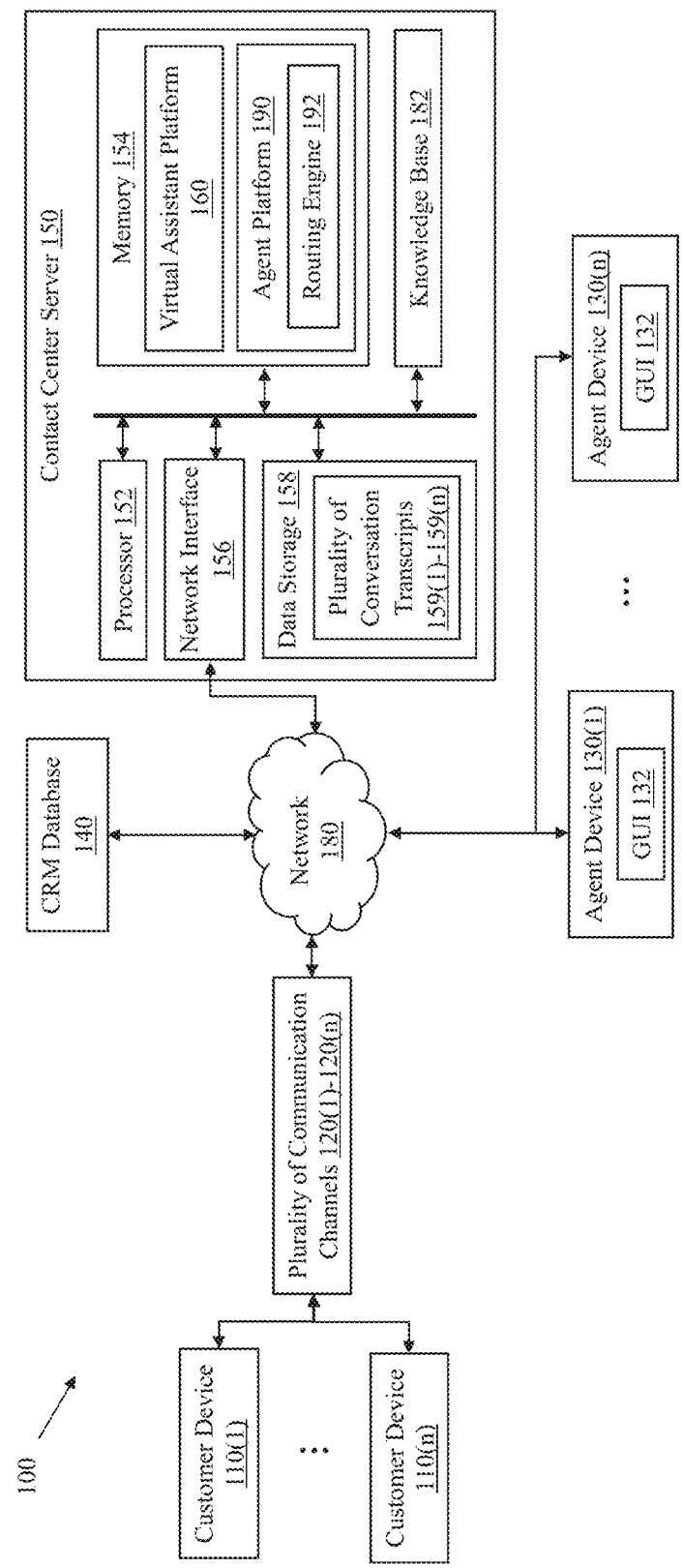
FIG. 1A is a block diagram of an exemplary environment with a contact center server configured to improve customer service by monitoring real-time conversations between customers and human agents and providing automated assistance to the human agents.

Referring to FIG. 1A, a block diagram of an exemplary environment 100 with a contact center server 150 configured to improve customer service by monitoring real-time conversations between customers and human agents and providing automated assistance to the human agents. The environment 100 includes: a plurality of customer devices 110(1)-110(n), a plurality of communication channels 120(1)-120(n), a plurality of agent devices 130(1)-130(n), a customer relationship management (CRM) database 140, and a contact center server 150 coupled together via a network 180, although the environment 100 can include other types and numbers of systems, devices, components, and/or elements and in other topologies and deployments. Although not illustrated, the environment 100 may include additional network components, such as routers, switches, and other devices, which are well known to those of ordinary skill in the art and thus will not be described here.

The contact center server 150 handles customer requests from one or more of the plurality of customer devices 110(1)-110(n) reaching the contact center server 150 via voice and digital channels. The contact center server 150 may use automation and artificial intelligence (e.g., virtual assistants), the human agents, or a combination of the virtual assistants and the human agents to address the customer requests. In one example, a customer request from one of the plurality of customer devices 110(1)-110(n) may be directly transferred to a human agent at one of the plurality of agent devices 130(1)-130(n). In another example, the customer request from one of the plurality of customer devices 110(1)-110(n) may be initially handled by the contact center server 150 and subsequently transferred to the human agent at one of the plurality of agent devices 130(1)-130(n) when intervention of the human agent is required.

The contact center server 150 includes a processor 152, a memory 154, a network interface 156, a data storage 158 and a knowledge base 182, although the contact center server 150 may include other types and/or numbers of components in other configurations. In addition, the contact center server 150 may include an operating system (not shown). In one example, the contact center server 150 and/or processes performed by the contact center server 150 may be implemented using a networking environment (e.g., cloud computing environment). In another example, the contact center server 150 may be offered as a service by the cloud computing environment.

The components of the contact center server 150 may be coupled to each other by a graphics bus, a memory bus, an Industry Standard Architecture (ISA) bus, an Extended Industry Standard Architecture (EISA) bus, a Micro Channel Architecture (MCA) bus, a Video Electronics Standards Association (VESA) Local bus, a Peripheral Component Interconnect (PCI) bus, a PCI-Express (PCIe) bus, a serial advanced technology attachment (SATA) bus, a Personal Computer Memory Card Industry Association (PCMCIA) bus, a Small Computer Systems Interface (SCSI) bus, or a combination of two or more of these.

The processor 152 of the contact center server 150 may execute one or more computer-executable instructions stored in the memory 154 to implement the methods illustrated and described with reference to the examples herein, although the processor can execute other types and numbers of instructions and perform other types and numbers of operations. The processor 152 may comprise one or more central processing units (CPUs), or general-purpose processors with a plurality of processing cores, such as Intel® processor(s), AMD® processor(s), although other types of processor(s) could be used in other configurations.

The memory 154 of the contact center server 150 is an example of a non-transitory computer readable storage medium capable of storing information or instructions for the processor 152 to operate on. The instructions, which when executed by the processor 152, perform one or more of the disclosed examples. In one example, the memory 154 may be a random access memory (RAM), a dynamic random access memory (DRAM), a static random access memory (SRAM), a persistent memory (PMEM), a nonvolatile dual in-line memory module (NVDIMM), a hard disk drive (HDD), a read only memory (ROM), an erasable programmable read-only memory (EPROM), an electrically erasable programmable read-only memory (EEPROM), a programmable ROM (PROM), a flash memory, a compact disc (CD), a digital video disc (DVD), a magnetic disk, a universal serial bus (USB) memory card, a memory stick, or a combination of two or more of these. It may be understood that the memory 154 may include other electronic, magnetic, optical, electromagnetic, infrared or semiconductor based non-transitory computer readable storage medium which may be used to tangibly store instructions, which when executed by the processor 152, perform the disclosed examples. The non-transitory computer readable storage medium is not a transitory signal per se and is any tangible medium that contains and stores the instructions for use by or in connection with an instruction execution system, apparatus, or device. Examples of the programmed instructions and steps stored in the memory 154 are illustrated and described by way of the description and examples herein.

As illustrated in FIG. 1A, the memory 154 may include instructions corresponding to a virtual assistant platform 160 and an agent platform 190 of the contact center server 150, although other types and/or numbers of instructions in the form of programs, functions, methods, procedures, definitions, subroutines, or modules may be stored. The contact center server 150 receives communications from one or more of the plurality of customer devices 110(1)-110(n) and uses the virtual assistant platform 160 and/or the agent platform 190 to provide responses to the received communications. Further, the virtual assistant platform 160 and the agent platform 190 may be connected to each other using a middleware.

The network interface 156 may include hardware, software, or a combination of hardware and software, enabling the contact center server 150 to communicate with the components illustrated in the environment 100, although the network interface 156 may enable communication with other types and/or number of components in other configurations. In one example, the network interface 156 provides interfaces between the contact center server 150 and the network 180. The network interface 156 may support wired or wireless communication. In one example, the network interface 156 may include an Ethernet adapter or a wireless network adapter to communicate with the network 180.

The plurality of customer devices 110(1)-110(n) may communicate with the contact center server 150 via the network 180. The customers at the plurality of customer devices 110(1)-110(n) may access and interact with the functionalities exposed by the contact center server 150 via the network 180. The plurality of customer devices 110(1)-110(n) may include any type of computing device that can facilitate customer interaction, for example, a desktop computer, a laptop computer, a tablet computer, a smartphone, a mobile phone, a wearable computing device, or any other type of device with communication and data exchange capabilities. The plurality of customer devices 110(1)-110(n) may include software and hardware capable of communicating with the contact center server 150 via the network 180. Also, the plurality of customer devices 110(1)-110(n) may render and display the information received from the contact center server 150. The plurality of customer devices 110(1)-110(n) may render an interface of one or more of the plurality of communication channels 120(1)-120(n) which the customers may use to communicate with the contact center server 150.

The customers at the plurality of customer devices 110(1)-110(n) may communicate with the contact center server 150 via the network 180 by providing text input or voice input via one or more of the plurality of communication channels 120(1)-120(n). The plurality of communication channels 120(1)-120(n) may include channels such as, enterprise messengers (e.g., Skype for Business, Microsoft Teams, Kore.ai Messenger, Slack, Google Hangouts, or the like), social messengers (e.g., Facebook Messenger, WhatsApp Business Messaging, Twitter, Lines, Telegram, or the like), web & mobile channels (e.g., a web application, a mobile application), interactive voice response (IVR) channels, voice channels (e.g., Google Assistant, Amazon Alexa, or the like), live chat channels (e.g., LivePerson, LiveChat, Zendesk Chat, Zoho Desk, or the like), a webhook channel, a short messaging service (SMS), email, a software-as-a-service (SaaS) application, voice over internet protocol (VOIP) calls, computer telephony calls, or the like. It may be understood that to support voice-based communication channels, the environment 100 may include, for example, a public switched telephone network (PSTN), a voice server, a text-to-speech (TTS) engine, and/or an automatic speech recognition (ASR) engine.

The human agents at the plurality of agent devices 130(1)-130(n) interact with the contact center server 150, the CRM database 140, and/or the plurality of customer devices 110(1)-110(n) via the network 180. In one example, the human agents at the plurality of agent devices 130(1)-130(n) may access the data storage 158, the knowledge base 182, and the CRM database 140 via one or more application programming interfaces (APIs), one or more hyperlinks, or one or more uniform resource locators (URLs) by way of example. The plurality of agent devices 130(1)-130(n) may be, a desktop computer, a laptop computer, a tablet computer, a smartphone, a mobile phone, or any other type of device with communication and data exchange capabilities. The plurality of agent devices 130(1)-130(n) may include one or more communication devices (not shown) through which the human agents may communicate with the customers at the plurality of customer devices 110(1)-110(n) over a cellular, a mobile, and/or a telephone network. Also, the plurality of agent devices 130(1)-130(n) comprise a graphical user interface (GUI) 132 that may render, and display data received from the contact center server 150 and/or the plurality of customer devices 110(1)-110(n). The plurality of agent devices 130(1)-130(n) may run applications such as web browsers or a contact center software, which may render the GUI 132, although other applications may render the GUI 132.

The plurality of customer devices 110(1)-110(n) and the plurality of agent devices 130(1)-130(n) may include components, such as, one or more processors, one or more memories, one or more input devices such as a keyboard, a mouse, a display device, a touch interface, and one or more communication interfaces, which may be coupled together by a data communication bus or other link, although each of the plurality of customer devices 110(1)-110(n) and the plurality of agent devices 130(1)-130(n) may have other types and/or numbers of other systems, devices, components, and/or other elements.

The network 180 enables the plurality of customer devices 110(1)-110(n), the plurality of agent devices 130(1)-130(n), the CRM database 140, or other such devices to communicate with the contact center server 150. The network 180 may be, for example, an ad hoc network, an extranet, an intranet, a wide area network (WAN), a virtual private network (VPN), a local area network (LAN), a wireless LAN (WLAN), a wireless WAN (WWAN), a metropolitan area network (MAN), internet, a portion of the internet, a portion of the public switched telephone network (PSTN), a cellular telephone network, a wireless network, a Wi-Fi network, a worldwide interoperability for microwave access (WiMAX) network, or a combination of two or more such networks, although the network 180 may include other types and/or numbers of networks in other topologies or configurations.

The network 180 may support protocols such as, Session Initiation Protocol (SIP), Hypertext Transfer Protocol (HTTP), Hypertext Transfer Protocol Secure (HTTPS), Media Resource Control Protocol (MRCP), Real Time Transport Protocol (RTP), Real-Time Streaming Protocol (RTSP), Real-Time Transport Control Protocol (RTCP), Session Description Protocol (SDP), Web Real-Time Communication (WebRTC), Transmission Control Protocol/Internet Protocol (TCP/IP), User Datagram Protocol (UDP), or Voice over Internet Protocol (VOIP), although other types and/or numbers of protocols may be supported in other topologies or configurations. The network 180 may also support standards or formats such as, for example, hypertext markup language (HTML), extensible markup language (XML), voiceXML, call control extensible markup language (CCXML), JavaScript object notation (JSON), although other types and/or numbers of data, media, and document standards and formats may be supported in other topologies or configurations. The network interface 156 of the contact center server 150 may include any interface that is suitable to connect with any of the above-mentioned network types and communicate using any of the above-mentioned network protocols, standards, or formats.

The CRM database 140 may store the customers information comprising at least one of profile details (e.g., name, address, phone numbers, gender, age, and occupation), communication channel preferences for communicating with the human agents at the plurality of agent devices 130(1)-130(n) (e.g., text chat, SMS, voice chat, multimedia chat, social networking chat, web, and telephone call), language preferences, membership information (e.g., membership ID, and membership category), transaction data (e.g., communication session details such as: date, time, call handle time, or the like), and past interactions data (such as sentiment, emotional state, call deflection, feedback, service ratings, or the like), although the CRM database 140 may store other types and numbers of customer information in other configurations. The CRM database 140 may be updated dynamically or periodically based on the customer conversations with the contact center server 150 and/or the human agents at the plurality of agent devices 130(1)-130(n). Although depicted as an external component in FIG. 1A, in one example, the CRM database 140 may be a part of the contact center server 150.

The data storage 158 of the contact center server 150 may store a plurality of conversation transcripts 159(1)-159(n), corresponding to the customer conversations handled by the contact center server 150 and/or the human agents at the plurality of agent devices 130(1)-130(n). The plurality of conversation transcripts 159(1)-159(n) comprise transcripts of text-based, or voice-based customer conversations, or the like. Although not shown, the data storage 158 may also store audio recordings of the voice-based customer conversations that are handled by the contact center server 150 and/or the human agents at the plurality of agent devices 130(1)-130(n). The data storage 158 may also store metadata associated with each of the customer conversations, such as: session identifier (session ID), conversation ID, customer information (such as name, identifier, address, contact details, or the like), human agent information (such as name, Identifier, or the like), timestamp information, customer sentiment, disposition codes, conversation summary, message tags, annotation data, or the like. The data storage 158 may be updated dynamically with the plurality of conversation transcripts 159(1)-159(n), audio recordings, and/or metadata associated with the customer conversations, in real-time. For example, a conversation transcript 159(1), an audio recording, and/or metadata corresponding to a customer conversation may be logged and stored in the data storage 158 in real-time during the conversation between the customer at a customer device 110(1) and the contact center server 150 or a human agent at an agent device 130(1). In one example, the plurality of conversation transcripts 159(1)-159(n) may comprise the metadata.

Further, one or more enterprise users such as administrators, managers, supervisors, developers, or the like may use the plurality of conversation transcripts 159(1)-159(n), the audio recordings, and/or the metadata associated with each of the customer conversations to, for example, understand the behavior of the customers, understand most common issues faced by the customers, look for customer issues that can be automated, review performance of virtual assistants that interact with the customers, review behavior and performance of the human agents who handle the customer conversations, perform other contact center analytics, or the like. In one example, the one or more enterprise users may review and annotate one or more of the plurality of conversation transcripts 159(1)-159(n), which will be stored as part of the metadata in the data storage 158.

The knowledge base 182 of the contact center server 150 may be a product-specific database, domain-specific database, or a combination of the product-specific database and the domain-specific database that includes information about products and services in the form of, for example, frequently asked questions (FAQs), documents (e.g., articles, books, magazines), online content, hyperlinks, audio-video data, or graphical data that may be organized as relational data, tabular data, knowledge graph, or the like. The knowledge base 182 may be accessed by the human agents at the plurality of agent devices 130(1)-130(n), the virtual assistant platform 160, and/or the agent platform 190 to address the customer requests. The human agents at the plurality of agent devices 130(1)-130(n) may search the knowledge base 182, for example, using the GUI 132, although other manners for interacting with the knowledge base may be used. The knowledge base 182 may be dynamically updated. The knowledge base 182 may comprise a number of different databases, some of which may be internal or external to the contact center server 150. Although there may be multiple databases, a single knowledge base 182 is illustrated in FIG. 1A for simplicity.

The agent platform 190 of the contact center server 150 facilitates communication between the contact center server 150 and the plurality of agent devices 130(1)-130(n). The agent platform 190 includes a routing engine 192 which handles routing the customer conversations to the plurality of agent devices 130(1)-130(n), although the agent platform 190 may include other types and/or numbers of components in other configurations. In one example, the routing engine 192 manages transferring a customer conversation handled by one of the plurality of virtual assistants to one or more of the plurality of agent devices 130(1)-130(n). In another example, messages from the virtual assistant platform 160 may be output to one or more of the plurality of agent devices 130(1)-130(n) via the agent platform 190. The routing engine 192 may be configured with artificial intelligence including one or more predictive models, rules, one or more programming modules, or one or more routing algorithms that are executable by the processor 152 to route the customer conversations to the human agents at the plurality of agent devices 130(1)-130(n).

Figure 1B:
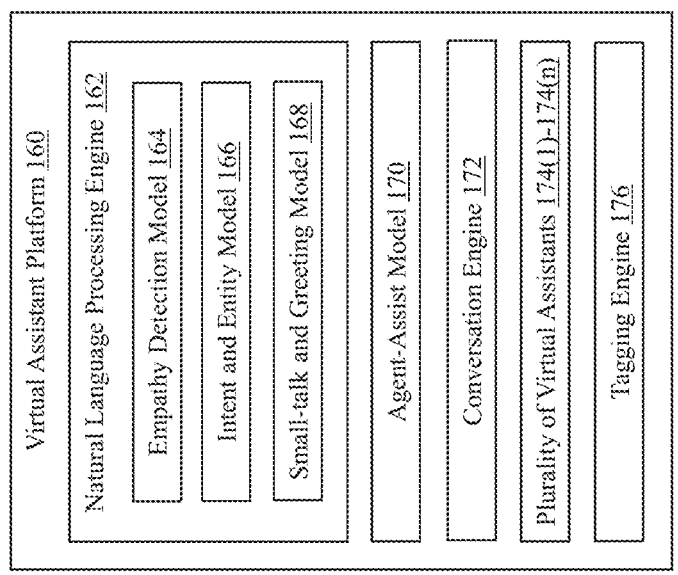
FIG. 1B is a block diagram of the virtual assistant platform of the contact center server illustrated in FIG. 1A.

FIG. 1B is a block diagram of the virtual assistant platform 160 of the contact center server 150 illustrated in FIG. 1A. As illustrated in FIG. 1B, the virtual assistant platform 160 hosts a natural language processing (NLP) engine 162, an agent-assist model 170, a conversation engine 172, a plurality of virtual assistants 174(1)-174(n) deployed by the one or more enterprise users, and a tagging engine 176, although the virtual assistant platform 160 may include other types and/or numbers of components in other configurations.

As illustrated in FIG. 1B, the NLP engine 162 comprises one or more classification models such as, an empathy detection model 164, an intent and entity model 166, and a small-talk and greeting model 168, although the NLP engine 162 may comprise a number of other classification models and/or algorithms in other configurations. The empathy detection model 164 is used to determine if there is any change in empathy between a message pair comprising an agent-assist response recommendation (hereinafter referred to as "automated response recommendation") and an agent response data. The intent and entity model 166 is used to determine if there is any change in at least one of one or more intents, one or more entities, or one or more entity values between the message pair comprising the automated response recommendation and the agent response data. The small-talk and greeting model 168 is used to determine if there is any change in small-talk (e.g., hi, hello, hey, how are you, or the like), or greeting (e.g., good morning, good evening, nice to meet you, welcome to our customer service, thank you for contacting us, or the like) between the message pair comprising the automated response recommendation and the agent response data. In one example, the empathy detection model 164, the intent and entity model 166, and the small-talk and greeting model 168 may be neural network models (e.g., feed-forward, recurrent, convolutional, and modular), or machine learning (ML) models (supervised, semi-supervised, or unsupervised).

The empathy detection model 164, the intent and entity model 166, and the small-talk and greeting model 168 are trained using a plurality of annotated message pairs, where each of the plurality of annotated message pairs comprises an automated response recommendation, an agent response data, and an expected output. FIG. 2A is a table of exemplary annotated message pairs that may be used for training the empathy detection model 164, although other types of annotated message pairs or training data may be used in other configurations to train the empathy detection model 164. FIG. 2B is a table of exemplary annotated message pairs that may be used for training the intent and entity model 166, although other types of annotated message pairs or training data may be used in other configurations to train the intent and entity model 166. FIG. 2C is a table of exemplary annotated message pairs that may be used for training the small-talk and greeting model 168, although other types of annotated message pairs or training data may be used in other configurations to train the small-talk and greeting model 168. In one example, each of the plurality of annotated message pairs may be manually entered by the one or more enterprise users using a graphical user interface presented by the contact center server 150. In another example, the one or more enterprise users may provide the plurality of annotated message pairs in the form, for example, a json file, a csv file, and an xlsx file, although the plurality of annotated message pairs may be provided in other formats in other configurations. The example annotated message pairs of FIGS. 2A-2C are illustrated in tabular form for simplicity.

The NLP engine 162 uses the plurality of conversation transcripts 159(1)-159(n) stored in the data storage 158 and generates the agent-assist model 170. The NLP engine 162 may identify data patterns in the conversations of the plurality of conversation transcripts 159(1)-159(n) and generate the agent-assist model 170 based on the identified data patterns. The enterprise users may use the plurality of conversation transcripts 159(1)-159(n) to train the agent-assist model 170. In one example, along with the plurality of conversation transcripts 159(1)-159(n), the NLP engine 162 may also use annotations in the plurality of conversation transcripts 159(1)-159(n) provided by the enterprise users to train the agent-assist model 170.

The agent-assist model 170 may be a neural network or an ML model which learns from the conversations between the customers at the plurality of customer devices 110(1)-110(n) and the human agents at the plurality of agent devices 130(1)-130(n). Further, the agent-assist model 170 may be a domain-independent or a domain-specific model. A domain-specific agent-assist model may be easy to maintain and may provide better assistance to the human agents at the plurality of agent devices 130(1)-130(n) when compared to a domain-independent agent-assist model. For example, the amount of training data required to train the domain-specific agent-assist model is very less when compared to the amount of training data required to train the domain-independent agent-assist model.

In one example, using the agent-assist model 170 of the virtual assistant platform 160, the contact center server 150 may assist the human agent at the agent device 130(1) to handle the conversation with the customer at the customer device 110(1) by recommending data such as, one or more responses, one or more next best actions (e.g., buttons to trigger API calls, launch applications, or trigger a robotic process automation (RPA) processes), one or more knowledge articles, one or more snippets from the one or more knowledge articles, hyperlinks to the one or more knowledge articles, or other relevant information based on at least one or more intents of the customer, current message of the customer, one or more previous messages of the customer, and context of the customer conversation. In another example, using the agent-assist model 170 of the virtual assistant platform 160, the contact center server 150 may assist the human agent at the agent device 130(1) by presenting at least one of: one or more intents, one or more entities, or one or more entity values identified from one or more customer messages.

An intent may be defined as a purpose of the customer at the customer device 110(1). The intent of the customer at the customer device 110(1) may be identified from the one or more messages sent by the customer at the customer device 110(1) and fulfilled by the contact center server 150 using one or more of the plurality of virtual assistants 174(1)-174(n), one or more human agents at one or more of the plurality of agent devices 130(1)-130(n), or a combination of one or more of the plurality of virtual assistants 174(1)-174(n) and one or more human agents at one or more of the plurality of agent devices 130(1)-130(n). Example intents include book flight, book train, book cab, restaurant search, check balance, transfer funds, search document, diagnose network, diagnose device, reset device, or the like, by way of example. To fulfill the customer's intent, the contact center server 150 may need one or more entities defined by entity parameters including at least one of an entity name, an entity type, and an entity value, although there may be other types and/or numbers of entity parameters in other configurations. In one example, the entity type may include airport, address, city, company name, color, currency, product category, date, time, location, place name, or the like. For example, in the customer's message—"book flight ticket from San Diego to New York", the intent of the customer at the customer device 110(1) is "book flight", and "San Diego" and "New York" are the entity values whose entity type is "city".

The conversation engine 172 of the virtual assistant platform 160 orchestrates the conversations between the customers at one or more of the plurality of customer devices 110(1)-110(n) and the contact center server 150 by executing configurations of one or more of the plurality of virtual assistants 174(1)-174(n). The conversation engine 172 may also orchestrate the conversations between the customers at one or more of the plurality of customer devices 110(1)-110(n) and the human agents at one or more of the plurality of agent devices 130(1)-130(n). The conversation engine 172 manages a context of the conversation between the customer at the customer device 110(1) and the contact center server 150 or the human agent at the agent device 130(1).

The conversation engine 172 may be implemented, for example, as a finite state machine that uses states and state information to orchestrate the conversation between the customer at the customer device 110(1) and the contact center server 150 or the human agent at the agent device 130(1), although the conversation engine 172 may be implemented in other ways and/or configurations. The conversation engine 172 may also comprise decision trees corresponding to one or more of the plurality of virtual assistants 174(1)-174(n). Further, the conversation engine 172 may manage digressions or interruptions from the customer at the customer device 110(1) during the conversation with the contact center server 150 and/or the human agent at the agent device 130(1).

Each of the plurality of virtual assistants 174(1)-174(n) may include one or more rules, one or more dialog flows, one or more neural networks, or one or more artificial intelligence-based definitions, models, or instructions. Further, in one example, the agent-assist functionalities may be defined and configured as part of one or more dialog flows. In this example, the one or more enterprise users may define and configure the agent-assist functionalities (e.g., one or more responses, one or more next best actions, one or more relevant knowledge articles, or the like) at each node of the one or more dialog flows corresponding to one or more intents of the plurality of virtual assistants 174(1)-174(n), which may be triggered to assist the human agents at the plurality of agent devices 130(1)-130(n) during the customer conversations. For example, during the conversation between the human agent at the agent device 130(1) and the customer at the customer device 110(1), when the virtual assistant platform 160 identifies a customer intent and executes a dialog flow corresponding to the identified customer intent, based on the stage in the dialog flow, the corresponding one or more agent-assist functionalities will be triggered by the virtual assistant platform 160 to assist the human agent at the agent device 130(1).

The tagging engine 176 identifies and associates one or more tags to one or more messages sent as part of the conversation by the customer at the customer device 110(1) and the human agent at the agent device 130(1) based on at least one of: message content or the context of the conversation. In one example, the tagging engine 176 may not associate any tag(s) to one or more messages of the conversation. The one or more tags may include small-talk, greeting, intent, acknowledgement, escalation, empathy added, priority change, or the like, although other types and/or numbers of tags may be used. The tagging engine 176 may be configured as an ML model. For each tag, the one or more enterprise users may define one or more rules and/or provide training data comprising a plurality of annotated utterances.

In one example, when the human agent at the agent device 130(1) sends an agent response data to the customer device 110(1) by changing an automated response recommendation provided by the agent-assist model 170 of the virtual assistant platform 160, the tagging engine 176 associates one or more tags to the agent response data based on outputs of the empathy detection model 164, the intent and entity model 166 and the small-talk and greeting model 168.

Figure 3:
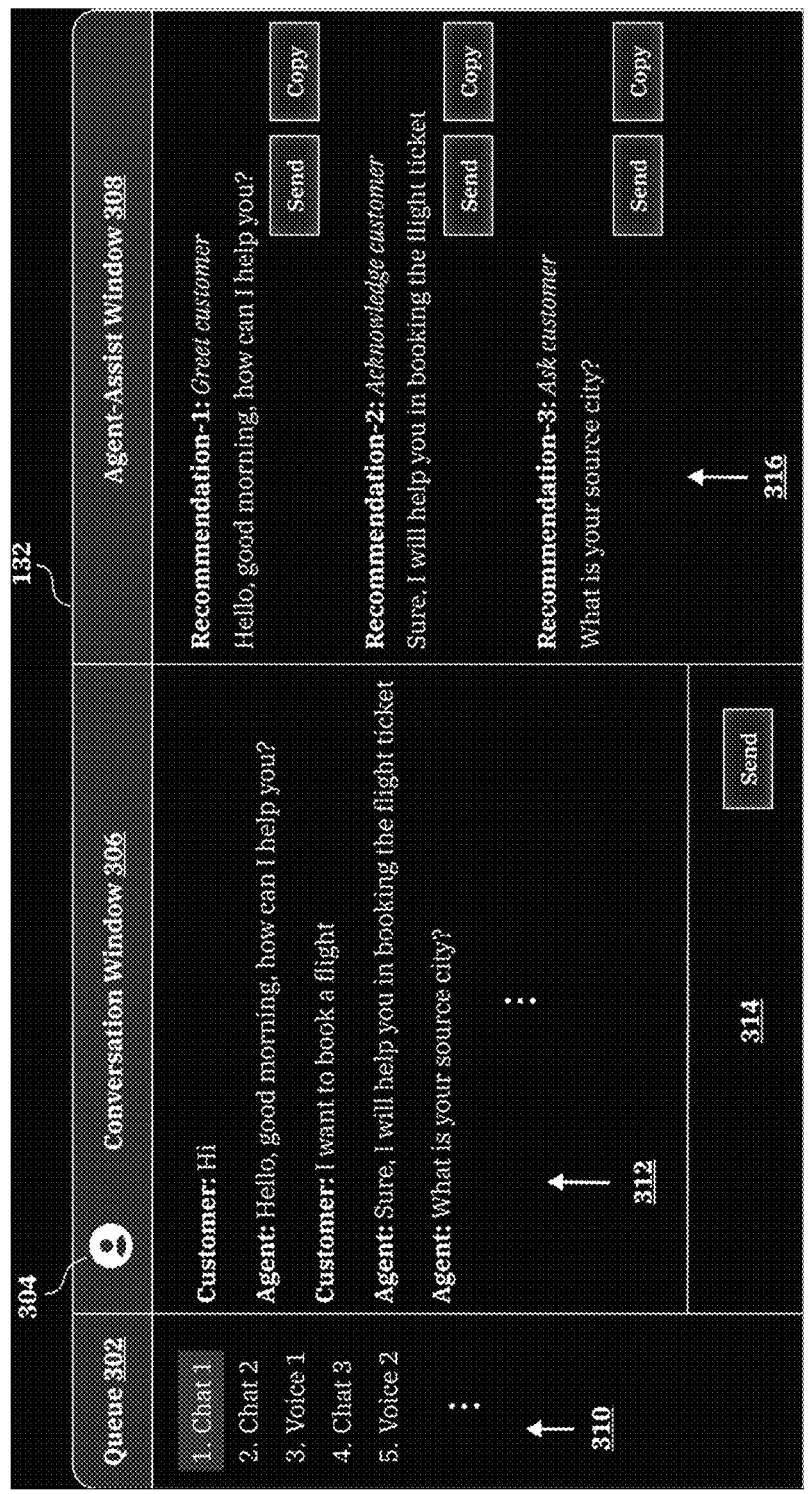
FIG. 3 is an example wireframe of a graphical user interface that is displayed to a human agent at an agent device.

Referring to FIG. 3, an example wireframe of a graphical user interface (GUI) 132 provided by the contact center server 150 to the human agents at the plurality of agent devices 130(1)-130(n) is illustrated. The GUI 132 may be displayed using a contact center software executable on the plurality of agent devices 130(1)-130(n), or a web page provided by the contact center server 150 and rendered in a browser executable on the plurality of agent devices 130(1)-130(n), although the GUI 132 may be displayed by other types and/or numbers of applications in other configurations. The contact center software or the web page provided by the contact center server 150 enables the human agents at the plurality of agent devices 130(1)-130(n) to communicate with the customers at the plurality of customer devices 110(1)-110(n), view information related to the customers or customer conversations, view recommendation data (e.g., one or more automated response recommendations, one or more next best actions, or the like) provided by the virtual assistant platform 160 using the agent-assist model 170, search and retrieve information from data sources (e.g., the CRM database 140, the data storage 158, or the knowledge base 182), communicate with third-party applications or databases, or the like. Further, the contact center software or the web page provided by the contact center server 150 at the plurality of agent devices 130(1)-130(n) allows the contact center server 150 to record conversations between the customers at the plurality of customer devices 110(1)-110(n) and the human agents at the plurality of agent devices 130(1)-130(n) and monitor performance of the human agents at the plurality of agent devices 130(1)-130(n).

As illustrated in FIG. 3, the GUI 132 may include a queue window 302, a conversation window 306, and an agent-assist window 308, although other types and/or numbers of windows, panels, or widgets may be included in the GUI 132 in other configurations. The queue window 302 shows a list of conversations 310 (e.g., chat 1, chat 2, voice 1, chat 3, and voice 2) that are transferred to the human agent at the agent device 130(1) by the routing engine 192.

The conversation window 306 may include a profile icon 304, a conversation transcript area 312, and a compose bar 314 for the human agent at the agent device 130(1) to compose and send a response to the customer at the customer device 110(1) during the conversation. The human agent at the agent device 130(1) may access the customer profile by clicking on the profile icon 304. In the conversation transcript area 312, the conversation data exchanged between the human agent at the agent device 130(1) and the customer at the customer device 110(1) is displayed to the human agent at the agent device 130(1) by the contact center server 150. In the conversation transcript area 312, the conversation data corresponding to the conversation that is selected and active (i.e., chat 1 in FIG. 3) from the list of conversations 310 by the human agent at the agent device 130(1) is displayed. Further, the conversation that is selected and active (chat 1, in this example) from the list of conversations 310 by the human agent at the agent device 130(1) may be highlighted as illustrated in FIG. 3, although the conversation that is selected and active may be indicated in different ways such as, for example, by providing a small pop-out view, changing the font color, using a status indicator, or the like.

As illustrated in FIG. 3, one or more automated response recommendations 316 (e.g., recommendation-1, recommendation-2, and recommendation-3) in recommendation data are displayed to the human agent at the agent device 130(1) in the agent-assist window 308 by the virtual assistant platform 160. The recommendation data is determined by the virtual assistant platform 160 using the agent-assist model 170 during the conversation between the human agent at the agent device 130(1) and the customer at the customer device 110(1). In one example, the recommendation data (e.g., the one or more automated response recommendations 316) may be determined by the virtual assistant platform 160 using the agent-assist model 170 based on at least one of: a context of the conversation; one or more intents of the customer; a sentiment of the customer in the previous interaction(s); a stage in the conversation; or a current message data or previous messages of the customer in the conversation, although the recommendation data may be determined by the virtual assistant platform 160 using the agent-assist model 170 based on other types and/or number of parameters in other configurations.

Further, as illustrated in FIG. 3, in the agent-assist window 308, for each of the one or more automated response recommendations 316 in the recommendation data, a send option and a copy option are provided for selection by the human agent at the agent device 130(1). The send option and the copy option may be provided as clickable buttons, as illustrated in FIG. 3, although the send option and the copy option may be provided in other forms such as, radio buttons, check boxes, or any other user interface selectable controls.

In one example, as part of the conversation data, when the human agent at the agent device 130(1) wants to use one of the one or more automated response recommendations 316 (for example, recommendation-1) "as-is" to respond to the customer at the customer device 110(1), the human agent at the agent device 130(1) selects the send option corresponding to the recommendation-1, so that the recommendation-1 will be sent "as-is" as an agent response data to the customer device 110(1).

In another example, as part of the conversation data, the human agent at the agent device 130(1) selects the copy option corresponding to one of the one or more automated response recommendations 316 (for example, recommendation-1) when the human agent at the agent device 130(1) wants to modify and use the recommendation-1 to respond to the customer at the customer device 110(1). In this example, when the copy option corresponding to the recommendation-1 is selected, the recommendation-1 will be presented in the compose bar 314 for editing by the human agent at the agent device 130(1). Further, in this example, when the human agent at the agent device 130(1) selects the copy option corresponding to the recommendation-1, a flag may be set by the agent-assist model 170 to indicate to the virtual assistant platform 160 that the human agent at the agent device 130(1) is not using the recommendation-1 "as-is". Subsequently, the human agent at the agent device 130(1) may modify (e.g., by rephrasing, by adding new content, or by deleting content) the recommendation-1 in the compose bar 314 and send the modified recommendation-1 to the customer at the customer device 110(1) as the agent response data by either pressing an enter key on a keyboard connected to the agent device 130(1) or selecting a send button present in the compose bar 314 (illustrated in FIG. 3).

Here, the rephrasing of the recommendation-1 by the human agent at the agent device 130(1) may comprise at least one of changing tone or grammar of the recommendation-1 by the human agent at the agent device 130(1). For example, if the recommendation-1 provided is "Book a flight from Washington DC to New York, is that correct?", the human agent at the agent device 130(1) may rephrase the recommendation-1 by changing tone as "Should I book a flight from Washington DC to New York?". Further, adding new content to the recommendation-1 by the human agent at the agent device 130(1) may comprise at least one of: adding one or more intents, adding one or more entities, adding one or more entity values, adding empathy, adding small-talk, or adding a greeting, although other content may be added by the human agent at the agent device 130(1) to the recommendation-1. Further, modifying content of the recommendation-1 by the human agent at the agent device 130(1) may comprise at least one of: modifying one or more intents, modifying one or more entities, or modifying one or more entity values, although other content may be modified by the human agent at the agent device 130(1) in the recommendation-1. Further, deleting content from the recommendation-1 by the human agent at the agent device 130(1) comprises at least one of: deleting one or more intents, deleting one or more entities, deleting one or more entity values, deleting empathy, deleting small-talk, deleting a greeting, or deleting any portion of the recommendation-1.

Figure 4:
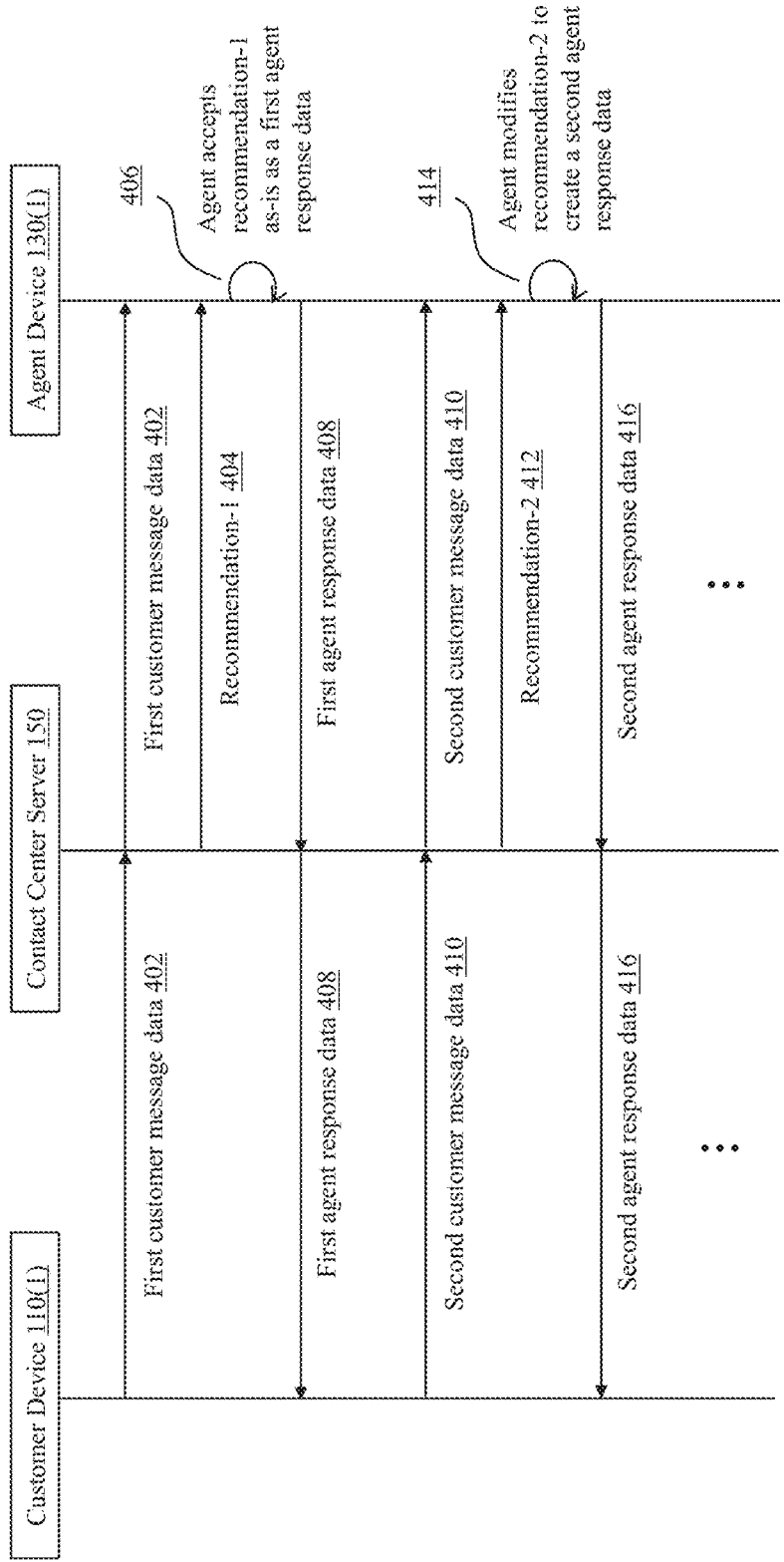
FIG. 4 is a sequence diagram illustrating an exemplary method for handling a customer conversation at the contact center server.

Referring to FIG. 4, a sequence diagram illustrating an exemplary method for handling a conversation at the contact center server 150. In one example, the conversation may be a text-based conversation or a voice-based conversation. It may be understood that the FIG. 4 depicts a few steps involved in the conversation between the customer at the customer device 110(1), the contact center server 150 and the human agent at the agent device 130(1), although other types and/or numbers of steps may be performed in other configurations. Further, it may be understood that the steps illustrated and described do not have to take place in the sequence illustrated.

In the illustrated exemplary method in FIG. 4, the contact center server 150 receives a first customer message data 402 from the customer device 110(1) and sends the received first customer message data 402 to the agent device 130(1) for display to the human agent in the conversation window 306 of the GUI 132. Further, based on the first customer message data 402, the contact center server 150 using the agent-assist model 170 of the virtual assistant platform 160, automatically generates a recommendation-1 404 and provides the recommendation-1 404 to the agent device 130(1) for display to the human agent in the agent-assist window 308 of the GUI 132 of the agent device 130(1). At 406, from the agent-assist window 308, the human agent at the agent device 130(1) accepts the recommendation-1 404 "as-is" as a first agent response data 408. Further, the contact center server 150 receives the first agent response data 408 from the agent device 130(1) and sends the first agent response data 408 to the customer device 110(1).

Further, in the illustrated exemplary method in FIG. 4, the contact center server 150 receives a second customer message data 410 from the customer device 110(1) and sends the received second customer message data 410 to the agent device 130(1) for display to the human agent in the conversation window 306 of the GUI 132. Further, based on the second customer message data 410, the contact center server 150 using the agent-assist model 170 of the virtual assistant platform 160, automatically generates a recommendation-2 412 and sends the recommendation-2 412 to the agent device 130(1) for display to the human agent in the agent-assist window 308 of the GUI 132. At 414, the human agent at the agent device 130(1) modifies the recommendation-2 412 to create a second agent response data 416. Further, the contact center server 150 receives the second agent response data 416 from the agent device 130(1) and sends the second agent response data 416 to the customer device 110(1).

Figure 5:
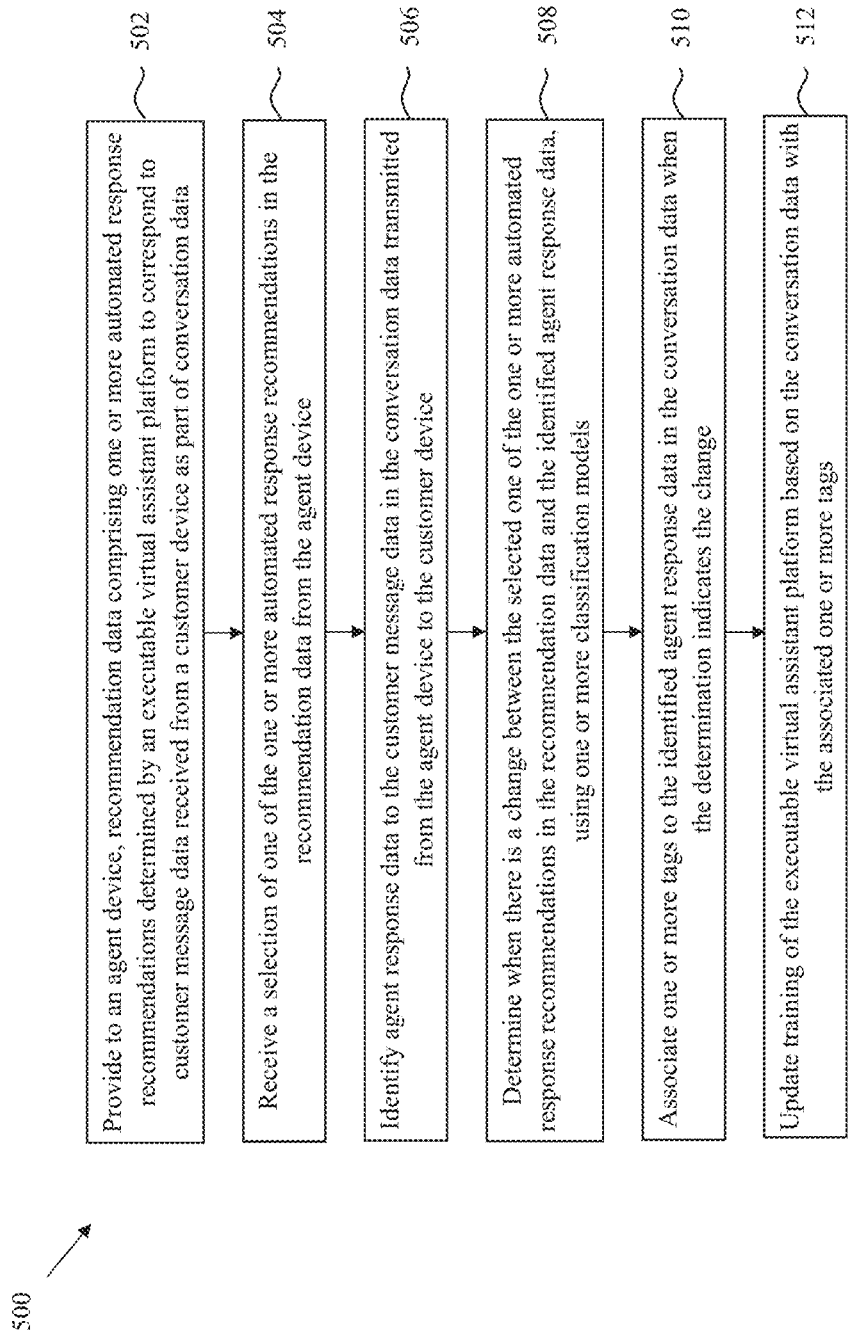
FIG. 5 is a flowchart of an exemplary method for tagging agent response data in conversation data and updating training of a virtual assistant platform at the contact center server.

Referring to FIG. 5, a flowchart of an exemplary method 500 for tagging agent response data in conversation data and updating training of the virtual assistant platform 160 at the contact center server 150 according to an example of the present disclosure is illustrated. The exemplary method 500 comprises the virtual assistant platform 160 which hosts and manages the agent-assist model 170 to assist the human agent at the agent device 130(1) to handle the conversation with the customer at the customer device 110(1). The exemplary method 500 may be performed by the contact center server 150 during the conversation between the human agent at the agent device 130(1) and the customer at the customer device 110(1), although the method 500 may be performed at other types and/or numbers of time periods. The contact center 150 may interact with other components of the environment 100 to perform the steps of the exemplary method 500.

At step 502, the contact center server 150 provides to the agent device 130(1), recommendation data comprising one or more automated response recommendations 316 determined by the executable virtual assistant platform 160 to correspond to customer message data received from the customer device 110(1) as part of conversation data. The conversation data between the customer at the customer device 110(1) and the human agent at the agent device 130(1) may be a text-based data, a voice-based data, or a combination of the text-based data and the voice-based data. The conversation data may comprise customer message data, agent response data, recommendation data, tags, or other metadata of the conversation, although the conversation data may comprise other types and numbers of information related to the conversation. The recommendation data corresponding to the customer message data may be determined by the executable virtual assistant platform 160 using the agent-assist model 170. In one example, the recommendation data may comprise at least one of: the one or more automated response recommendations 316, one or more next best actions, one or more knowledge articles, or one or more hyperlinks to the one or more knowledge articles, although the recommendation data may comprise other types and numbers of other relevant information. The one or more automated response recommendations 316 may comprise at least one of: one or more responses or one or more snippets from the one or more knowledge articles.

Further, the recommendation data (e.g., the one or more automated response recommendations 316) is displayed to the human agent at the agent device 130(1) in the agent-assist window 308 in the GUI 132 (as illustrated in FIG. 3) by the contact center server 150 in real-time during the conversation between the human agent at the agent device 130(1) and the customer at the customer device 110(1).

The context of the conversation may be defined as a memory of a conversation flow comprising message turns between the customer at the customer device 110(1) and the human agent at the agent device 130(1). The context of the conversation is tracked and maintained by the conversation engine 172. In one example, the context of the conversation is used to determine the meaning of each message data that is shared as part of the conversation data. The sentiment of the customer is defined as a metric that indicates customer feelings towards a brand or a service, which can be measured on a scale between positive and negative, or as an emotion (e.g., angry, sad, happy, or the like). The stage in the conversation may be one of: small-talk, greeting, information gathering and extracting (intent(s) and/or entities), resolution, or closing, although there may be other stages in the conversation that may be defined in other configurations.

Referring to FIG. 5, at step 504, the contact center server 150 receives an indication from the agent device 130(1) of a selection of one of the one or more automated response recommendations 316 in the recommendation data by the human agent at the agent device 130(1). Hereinafter, the selected one of the one or more automated response recommendations 316 is referred to as "selected response recommendation". The contact center server 150 receives the indication about the selection when the human agent at the agent device 130(1) selects either the "send" option or the "copy" option corresponding to the one of the one or more automated response recommendations 316. In one example, when the human agent at the agent device 130(1) selects the "send" option corresponding to the one of the one or more automated response recommendations 316, the contact center server 150 sends the selected response recommendation to the customer device 110(1) "as-is" as agent response data. In another example, when the human agent at the agent device 130(1) selects the "copy" option corresponding to the one of the one or more automated response recommendations 316, the contact center server 150 presents the selected response recommendation in the compose bar 314 of the GUI 132, so that the human agent at the agent device 130(1) may modify the selected response recommendation and send the modified version of the selected response recommendation to the customer device 110(1) as the agent response data.

At step 506, the contact center server 150 identifies the agent response data to the customer message data in the conversation data transmitted from the agent device 130(1) to the customer device 110(1). In one example, the contact center server 150 uses the metadata of the conversation, managed by the conversation engine 172, such as a human agent identifier associated with the agent response data to identify the agent response data to the customer message data in the conversation data.

At step 508, the contact center server 150 determines when there is a change between the selected one of the one or more automated response recommendations 316 (i.e., the selected response recommendation) in the recommendation data and the agent response data identified at step 506, using one or more classification models. The one or more classification models may comprise the empathy detection model 164, the intent and entity model 166, or the small-talk and greeting model 168. In one example, to determine the change, the contact center server 150 inputs the message pair comprising the selected response recommendation that is selected at step 504 and the agent response data to the empathy detection model 164, the intent and entity model 166, and the small-talk and greeting model 168 in this example, although other types and/or numbers of other models and combinations may be used. The empathy detection model 164, based on the training provided, determines if there is any change in empathy between the selected response recommendation and the agent response data. The intent and entity model 166, based on the training provided, determines if there is any change in one or more intents, one or more entities, or one or more entity values between the selected response recommendation and the agent response data. The small-talk and greeting model 168, based on the training provided, determines if there is any change in small-talk or greeting between the selected response recommendation and the agent response data. The outputs of the empathy detection model 164, the intent and entity model 166, and the small-talk and greeting model 168 may indicate either there is "no change" or there are one or more changes between the selected response recommendation and the agent response data.

In another example, before inputting the selected response recommendation and the agent response data to the empathy detection model 164, the intent and entity model 166, and the small-talk and greeting model 168, to determine the change, the contact center server 150 may first compare the selected response recommendation and the agent response data for text similarity. The text similarity may be measured using techniques such as, cosine similarity, or string comparison, although other text similarity measuring techniques may be used. In this example, the contact center server 150 inputs the selected response recommendation and the agent response data to the empathy detection model 164, the intent and entity model 166, and the small-talk and greeting model 168 to determine the change only when the measured text similarity is below a threshold that is predefined by the enterprise user.

Referring to FIG. 5, at step 510, the contact center server 150 associates one or more tags to the identified agent response data in the conversation data when the determination at step 508 indicates the change. Here, the contact center server 150 may use the tagging engine 176 to associate the one or more tags to the agent response data in the conversation data. In one example, the contact center server 150 associates the one or more tags to the agent response data in the conversation data based on the outputs of the empathy detection model 164, the intent and entity model 166, and the small-talk and greeting model 168. The one or more tags may comprise rephrased, small-talk added, greeting added, empathy added, empathy deleted, intent added, intent modified, intent deleted, entity added, entity modified, entity deleted, entity value added, entity value modified, entity value deleted, used as-is (recommendation used as-is), or the like, although other types and/or number of tags may be used. The contact center server 150 may store the conversation data along with the associated one or more tags, in the data storage 158. Here, the associated one or more tags may be stored as part of metadata of the conversation data by way of an example. The conversation engine 172 or the tagging engine 176 may create and manage metadata of the conversations, although other types and/or numbers of components in the virtual assistant platform 160 may create and manage the metadata.

Subsequently, at step 512, the contact center server 150 automatically updates training of the executable virtual assistant platform 160 based on the conversation data with the associated one or more tags. According to the exemplary method 500, it may be understood that updating the training of the virtual assistant platform 160 implicitly indicates that the agent-assist model 170 is updated. In one example, the contact center server 150 automatically updates the training of the virtual assistant platform 160 based on the conversation data along with the associated one or more tags, either in real-time or during training update schedules defined for the virtual assistant platform 160 or the agent-assist model 170 by the enterprise user.

In another example, prior to automatically updating the training of the virtual assistant platform 160, the contact center server 150 may send a notification to the enterprise user device (not shown) about the change that is determined at step 508 and receive an approval from the enterprise user device to update the training of the virtual assistant platform 160. The contact center server 150 may also send the conversation data comprising the one or more associated tags along with the notification to the enterprise user device.

In this example, the notification to the enterprise user device may be sent in the form of an SMS, an email, an audio, or pop-up alert in the GUI of the enterprise user device, although other types and number of notification mechanisms may be used. Further, the notification to the enterprise user device may include the enterprise user selectable options such as, approve, reject, and review later, although other types and number of options may be included in the notification for selection by the enterprise user. The enterprise user selectable options may be provided in the form of clickable buttons, radio buttons, check boxes, or any other user interface selectable controls. Further, in this example, the enterprise user at the enterprise user device may approve the determined change by selecting the approve option corresponding to the received notification. After receiving the approval from the enterprise user device, the contact center server 150 automatically updates the training of the virtual assistant platform 160 as described at step 512. In this example, the enterprise user device may be operated by a supervisor, although the enterprise user device may be operated by any other enterprise user. Further, in this example, there may be other types and number of steps performed in other orders and/or configurations.

Further, in accordance with the above example, sending the notification about the determined change and receiving the approval from the enterprise user device, provides valuable feedback to the contact center server 150 that the change made by the human agent at the agent device 130(1) is appropriate and the conversation data along with the associated one or more tags can be used for updating the training of the virtual assistant platform 160, which may in turn improve the performance of the virtual assistant platform 160. Also, prior to automatically updating the training of the virtual assistant platform 160, sending the notification to the enterprise user device for approval, may prevent the training update of the virtual assistant platform 160 with inappropriate data or wrong feedback data.

In another example, instead of automatically updating training of the virtual assistant platform 160 with the conversation data along with the associated one or more tags, the contact center server 150 may send the notification about the change that is determined at step 508, and/or one or more suggestions to the enterprise user device to modify the training of the virtual assistant platform 160. The contact center server 150 may send the conversation data comprising the one or more associated tags along with the notification and the one or more suggestions to the enterprise user device. In this example, the one or more suggestions may include one or more utterances that may be added to training data of the agent-assist model 170 of the virtual assistant platform 160, one or more utterances that may be removed from the training data of the agent-assist model 170 of the virtual assistant platform 160, or one or more knowledge articles that may be added under frequently asked questions (FAQs) in a knowledge graph, although other types and number of suggestions may be provided.

In another example, when the agent-assist functionalities are defined and configured as part of a dialog flow of an intent, the contact center server 150 may send the notification about the determined change, the conversation data along with the associated one or more tags, and/or one or more suggestions to the enterprise user device operated by the enterprise user (e.g., a developer, and a system administrator) to modify the agent-assist functionalities. In this example, the one or more suggestions may include one or more alternate responses that may be added to the agent-assist functionalities, or one or more knowledge articles that may be added as part of the agent-assist functionalities, although other types and number of suggestions may be provided.

In another example, for the message pair comprising the selected response recommendation and the agent response data, when one of the empathy detection model 164, the intent and entity model 166, and the small-talk and greeting model 168 output—"rephrased", the contact center server 150 may add the agent response as an alternative to the selected response recommendation in the training data of the agent-assist model 170 of the virtual assistant platform 160.

Thus, in accordance with the examples described in the present disclosure, it may be understood that tagging the agent responses based on the actions (i.e. changes) performed by the human agents at the plurality of agent devices 130(1)-130(n) on the one or more automated response recommendations 316 provided by the agent-assist model 170 of the virtual assistant platform 160, provides a comprehensive feedback to the contact center server 150 that can be used for updating the training of and improving the agent-assist model 170 of the virtual assistant platform 160 to provide better recommendation data to the human agents at the plurality of agent devices 130(1)-130(n).

Referring to FIGS. 6A-6D, exemplary tables of conversations between the customer at the customer device 110(1) and the human agent at the agent device 130(1), one or more tags associated to messages of the conversations and the response recommendations provided by the agent-assist model 170 of the virtual assistant platform 160 are illustrated. The examples in FIGS. 6A-6D are in tabular form for simplicity, although the conversations, the one or more tags associated to the messages of the conversations, and the response recommendations provided by the agent-assist model 170 of the virtual assistant platform 160 may be stored in the form of json files, txt files, csv files, relational data tables, or the like.

Referring to FIG. 6A, a table of an exemplary conversation data between the human agent at the agent device 130(1) and the customer at the customer device 110(1) is illustrated. In this example, the response recommendations provided to the human agent at the agent device 130(1) by the agent-assist model 170 of the virtual assistant platform 160 are used as-is by the human agent at the agent device 130(1) as agent response data during the conversation. As illustrated in FIG. 6A, the response recommendations —602, 606 and 610 provided by the agent-assist model 170 are used as-is by the human agent at the agent device 130(1) as agent response data —604, 608, and 612, respectively. The message pairs comprising the response recommendation 602—the agent response data 604, the response recommendation 606—the agent response data 608, and the response recommendation 610—the agent response data 612 are provided as inputs to the empathy detection model 164, the intent and entity model 166, and the small-talk and greeting model 168. In this example, each message pair is analyzed by the empathy detection model 164, the intent and entity model 166, and the small-talk and greeting model 168. Based on the analysis, the empathy detection model 164, the intent and entity model 166, and the small-talk and greeting model 168 outputs "no change" for each message pair. Thus, based on the outputs of the empathy detection model 164, the intent and entity model 166, and the small-talk and greeting model 168, the tagging engine 176 associates a tag—"used as-is" to each of the agent response data —604, 608, and 612 in the conversation data, as illustrated in FIG. 6A.

Referring to FIG. 6B, a table of an exemplary conversation data between the human agent at the agent device 130(1) and the customer at the customer device 110(1). In this example, one of the response recommendations provided by the agent-assist model 170 of the virtual assistant platform 160 is modified by the human agent at the agent device 130(1) before sending it as the agent response data during the conversation. As illustrated in FIG. 6B, the customer at the customer device 110(1) expressed frustration in a customer message data 620. But a response recommendation 622 provided to the human agent at the agent device 130(1) by the agent-assist model 170 of the virtual assistant platform 160 for the customer message data 620 lacks empathy related phrase(s) or statement(s) to address the frustration expressed in the customer message data 620. Therefore, the human agent at the agent device 130(1) modifies the response recommendation 622 by adding an empathy statement—"I am sorry to hear that" at the beginning and sends the modified response recommendation as an agent response data 624 as part of the conversation data. The message pair comprising the response recommendation 622 and the agent response data 624 is provided as input to the empathy detection model 164, the intent and entity model 166, and the small-talk and greeting model 168 to determine if there is any change between the response recommendation 622 and the agent response data 624. In this example, by comparing the response recommendation 622 and the agent response data 624, the empathy detection model 164 outputs "empathy added", the intent and entity model 166 outputs "no change", and the small-talk and greeting model 168 outputs "no change". Subsequently, based on the outputs of the empathy detection model 164, the intent and entity model 166, and the small-talk and greeting model 168, the tagging engine 176 associates a tag—"empathy added" to the agent response data 624 in the conversation data, as illustrated in FIG. 6B.

Referring to FIG. 6C, a table of an exemplary conversation data between the human agent at the agent device 130(1) and the customer at the customer device 110(1). As illustrated in FIG. 6C, a customer message data 630 sent as part of the conversation data by the customer at the customer device 110(1) comprises two intents—"book flight" and "book hotel". However, a response recommendation 632 provided to the human agent at the agent device 130(1) by the agent-assist model 170 of the virtual assistant platform 160 for the customer message data 630 includes information related to the "book flight" intent but not the "book hotel" intent. Therefore, the human agent at the agent device 130(1) modifies the response recommendation 632 by adding information related to the "book hotel" intent—"book a hotel for Saturday night in New York" at the end and sends the modified response recommendation as an agent response data 634 as part of the conversation data. The message pair comprising the response recommendation 632 and the agent response data 634 is provided as input to the empathy detection model 164, the intent and entity model 166, and the small-talk and greeting model 168 to identify if there is any change between the response recommendation 632 and the agent response data 634. In this example, by comparing the response recommendation 632 and the agent response data 634, the empathy detection model 164 outputs "no change", the intent and entity model 166 outputs "intent added", and the small-talk and greeting model 168 outputs "no change". Subsequently, based on the outputs of the empathy detection model 164, the intent and entity model 166, and the small-talk and greeting model 168, the tagging engine 176 associates a tag—"intent added" to the agent response data 634 in the conversation data, as illustrated in FIG. 6C.

Referring to FIG. 6D, a table of an exemplary conversation data between the human agent at the agent device 130(1) and the customer at the customer device 110(1). As illustrated in FIG. 6D, the customer at the customer device 110(1) via a customer message data 640 sent as part of the conversation data, is asking for two medium cheese pizzas with olives and tomatoes. But a response recommendation 642 provided to the human agent at the agent device 130(1) by the agent-assist model 170 of the virtual assistant platform 160 for the customer message data 640 mentions only a single pizza instead of two. Therefore, the human agent at the agent device 130(1) modifies the response recommendation 642 by changing the pizza count from one to two and sends the modified response recommendation as an agent response data 644 as part of the conversation data. The message pair comprising the response recommendation 642 and the agent response data 644 is provided as input to the empathy detection model 164, the intent and entity model 166, and the small-talk and greeting model 168 to identify if there is any change between the response recommendation 642 and the agent response data 644. In this example, by comparing the response recommendation 642 and the agent response data 644, the empathy detection model 164 outputs "no change", the intent and entity model 166 outputs "entity value modified", and the small-talk and greeting model 168 outputs "no change". Subsequently, based on the outputs of the empathy detection model 164, the intent and entity model 166, and the small-talk and greeting model 168, the tagging engine 176 associates a tag—"entity value modified" to the agent response data 644 in the conversation data, as illustrated in FIG. 6D.

FIG. 7 is a table of an exemplary association between outputs of the empathy detection model 164, the intent and entity model 166 and the small-talk and greeting model 168, and tags associated by the tagging engine 176. The association between the outputs of the empathy detection model 164, the intent and entity model 166 and the small-talk and greeting model 168, and the tags associated by the tagging engine 176 to the agent response data may be stored in the memory 154.

In accordance with the examples described in the present disclosure, it may be understood that by tagging the agent response data in the conversation data based on the changes made by the human agents at the plurality of agent devices 130(1)-130(n) to the one or more automated response recommendations provided by the agent-assist model 170 of the virtual assistant platform 160, a comprehensive feedback is collected and the feedback is used for updating the training and improving the agent-assist model 170 to provide better response recommendations to the human agents at the plurality of agent devices 130(1)-130(n). Also, the supervisor's approval or rejection for the changes made by the human agents at the plurality of agent devices 130(1)-130(n) to the one or more automated response recommendations provided by the agent-assist model 170, acts as a filter to provide correct and relevant data to train the agent assist model 170.

In one example, based on supervisor's actions, for example, multiple rejections for the changes performed by the human agent at the agent device 130(1) corresponding to a specific intent, feedback may be collected and provided as input to a human agent coaching model. Subsequently, in this example, the human agent coaching model may provide necessary coaching to the human agent at the agent device 130(1) regarding the specific intent.

Further, the one or more tags associated to the message data in the conversation data of the plurality of conversations provide a way to the enterprise users to quickly search, filter, review, analyze, and/or classify the conversations. Further, contact centers may use the one or more tags associated to the agent response data in the conversation data of the plurality of the conversations to learn about, for example, behavior of the human agents towards the customers, usage of response recommendations by the human agents, pain points of the human agents, frequently modified response recommendations by the human agents, scenarios in which the response recommendations are modified by the human agents, areas of improvement of the agent-assist model, identifying correct feedback to train the agent-assist model, or the like. Further, the supervisors may use the tags associated to the agent response data in the conversation data of the plurality of the conversations to analyze the conversations and identify the top human agents whose modifications can be used to train the agent-assist model. Furthermore, the developers or the system administrators may use the tags associated to the agent response data in the conversation data of the plurality of the conversations to filter and analyze the conversations to determine gaps in the training provided to the agent-assist model and bridge such gaps to provide improved training data to the agent-assist model.

In accordance with the methods, systems, and non-transitory computer-readable mediums described above, by improving the agent-assist model, the human agents may address and resolve customer queries effectively and quickly. Further, the contact centers may reduce average handling time (AHT) and improve key performance indicators (KPIs) such as, for example, customer satisfaction score (CSAT), customer effort score (CES), net promoter score (NPS), first-call resolution, service level, contact quality, and human agents' performances, although other KPIs may be measured.

Having thus described the basic concept of the invention, it will be rather apparent to those skilled in the art that the foregoing detailed disclosure is intended to be presented by way of example only and is not limiting. Various alterations, improvements, and modifications will occur and are intended for those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations, therefore, is not intended to limit the claimed processes to any order except as may be specified in the claims. Accordingly, the invention is limited only by the following claims and equivalents thereto.

We claim:
1. A method comprising:
providing to an agent device, by a contact center server, recommendation data comprising one or more automated response recommendations determined by an executable virtual assistant platform to correspond to customer message data received from a customer device as part of conversation data;
determining, by the contact center server, using one or more classification models, when there are one or more changes between the one or more automated response recommendations and an agent response data to the customer message data sent as part of the conversation data;

associating, by the contact center server, one or more tags to the agent response data in the conversation data when the determination indicates the one or more changes; and updating training, by the contact center server, of the executable virtual assistant platform based on the conversation data with the associated one or more tags.

2. The method of claim 1, wherein the conversation data between the customer device and the agent device comprises text-based data or voice-based data.

3. The method of claim 1, wherein the one or more automated response recommendations in the recommendation data comprise at least one of: one or more responses; or one or more snippets from one or more knowledge articles.

4. The method of claim 1, wherein the determining when there are the one or more changes further comprises identifying at least one of: rephrasing the one or more automated response recommendations; adding new content to the one or more automated response recommendations; modifying content of the one or more automated response recommendations; or deleting content from the one or more automated response recommendations.

5. The method of claim 4, wherein the identifying the rephrasing the one or more automated response recommendations in the recommendation data further comprises identifying at least one of changing tone or grammar of the one or more automated response recommendations in the recommendation data.

6. The method of claim 4, wherein the identifying the adding of new content to the one or more automated response recommendations in the recommendation data further comprises identifying at least one of: adding one or more intents; adding one or more entities; adding one or more entity values; adding empathy; adding small-talk; or adding a greeting.

7. The method of claim 4, wherein the identifying the modifying of content of the one or more automated response recommendations in the recommendation data further comprises at least one of: modifying one or more intents; modifying one or more entities; or modifying one or more entity values.

8. The method of claim 4, wherein the identifying the deleting content from the one or more automated response recommendations in the recommendation data further comprises at least one of: deleting one or more intents; deleting one or more entities; deleting one or more entity values; deleting empathy; deleting small-talk; deleting a greeting; or deleting a portion of the one or more automated response recommendations.

9. The method of claim 1, wherein the one or more classification models comprise: an empathy detection model; an intent and entity model; or a small-talk and greeting model.

10. The method of claim 1, further comprising:
prior to the updating the training of the executable virtual assistant platform:
sending, by the contact center server, a notification to an enterprise user device about the determined one or more changes; and
receiving, by the contact center server, an approval from the enterprise user device to update the training of the executable virtual assistant platform based on the conversation data with the associated one or more tags.

11. A contact center server comprising:
one or more processors; and
a memory coupled to the one or more processors which are configured to execute programmed instructions stored in the memory to:
provide to an agent device recommendation data comprising one or more automated response recommendations determined by an executable virtual assistant platform to correspond to customer message data received from a customer device as part of conversation data;
determine using one or more classification models, when there are one or more changes between the one or more automated response recommendations and an agent response data to the customer message data sent as part of the conversation data;
associate one or more tags to the agent response data in the conversation data when the determination indicates the one or more changes; and
update training of the executable virtual assistant platform based on the conversation data with the associated one or more tags.

12. The contact center server of claim 11, wherein the conversation data between the customer device and the agent device comprises text-based data or voice-based data.

13. The contact center server of claim 11, wherein the one or more automated response recommendations in the recommendation data comprise at least one of: one or more responses; or one or more snippets from one or more knowledge articles.

14. The contact center server of claim 11, wherein to determine the one or more changes when there are the one or more changes, the one or more processors are further configured to identify at least one of: rephrasing the one or more automated response recommendations; adding new content to the one or more automated response recommendations; modifying content of the one or more automated response recommendations; or deleting content from the one or more automated response recommendations.

15. The contact center server of claim 14, wherein the identifying the rephrasing the one or more automated response recommendations in the recommendation data further comprises identifying at least one of changing tone or grammar of the one or more automated response recommendations in the recommendation data.

16. The contact center server of claim 14, wherein the identifying the adding of new content to the one or more automated response recommendations in the recommendation data further comprises identifying at least one of: adding one or more intents; adding one or more entities; adding one or more entity values; adding empathy; adding small-talk; or adding a greeting.

17. The contact center server of claim 14, wherein the identifying the modifying of content of the one or more automated response recommendations in the recommendation data further comprises at least one of: modifying one or more intents; modifying one or more entities; or modifying one or more entity values.

18. The contact center server of claim 14, wherein the identifying the deleting content from the one or more automated response recommendations in the recommendation data further comprises at least one of: deleting one or more intents; deleting one or more entities; deleting one or more entity values; deleting empathy; deleting small-talk; deleting a greeting; or deleting a portion of the one or more automated response recommendations.

19. The contact center server of claim 11, wherein the one or more classification models comprise: an empathy detection model; an intent and entity model; or a small-talk and greeting model.

20. The contact center server of claim 11, wherein the one or more processors, prior to the updating the training of the executable virtual assistant platform, are further configured to execute programmed instructions stored in the memory to:
send a notification to an enterprise user device about the determined one or more changes; and
receive an approval from the enterprise user device to update the training of the executable virtual assistant platform based on the conversation data with the associated one or more tags.

21. A non-transitory computer-readable medium storing instructions which when executed by one or more processors, causes the one or more processors to:
provide to an agent device recommendation data comprising one or more automated response recommendations determined by an executable virtual assistant platform to correspond to customer message data received from a customer device as part of conversation data;
determine using one or more classification models, when there are one or more changes between the one or more automated response recommendations and an agent response data to the customer message data sent as part of the conversation data;
associate one or more tags to the agent response data in the conversation data when the determination indicates the one or more changes; and
update training of the executable virtual assistant platform based on the conversation data with the associated one or more tags.

22. The non-transitory computer-readable medium of claim 21, wherein the conversation data between the customer device and the agent device comprises text-based data or voice-based data.

23. The non-transitory computer-readable medium of claim 21, wherein the one or more automated response recommendations in the recommendation data comprise at least one of: one or more responses; or one or more snippets from one or more knowledge articles.

24. The non-transitory computer-readable medium of claim 21, wherein the determining the one or more changes when there are the one or more changes further comprises identifying at least one of: rephrasing the one or more automated response recommendations; adding new content to the one or more automated response recommendations; modifying content of the one or more automated response recommendations; or deleting content from the one or more automated response recommendations.

25. The non-transitory computer-readable medium of claim 24, wherein the identifying the rephrasing the one or more automated response recommendations in the recommendation data further comprises identifying at least one of changing tone or grammar of the one or more automated response recommendations in the recommendation data.

26. The non-transitory computer-readable medium of claim 24, wherein the identifying the adding of new content to the one or more automated response recommendations in the recommendation data further comprises identifying at least one of: adding one or more intents; adding one or more entities; adding one or more entity values; adding empathy; adding small-talk; or adding a greeting.

27. The non-transitory computer-readable medium of claim 24, wherein the identifying the modifying of content of the one or more automated response recommendations in the recommendation data further comprises at least one of: modifying one or more intents; modifying one or more entities; or modifying one or more entity values.

28. The non-transitory computer-readable medium of claim 24, wherein the identifying the deleting content from the one or more automated response recommendations in the recommendation data further comprises at least one of: deleting one or more intents; deleting one or more entities; deleting one or more entity values; deleting empathy; deleting small-talk; deleting a greeting; or deleting a portion of the one or more automated response recommendations.

29. The non-transitory computer-readable medium of claim 21, wherein the one or more classification models comprise: an empathy detection model; an intent and entity model; or a small-talk and greeting model.

30. The non-transitory computer-readable medium of claim 21, further comprising instructions which when executed by the one or more processors prior to the updating the training of the executable virtual assistant platform, causes the one or more processors to:
send a notification to an enterprise user device about the determined one or more changes; and
receive an approval from the enterprise user device to update the training of the executable virtual assistant platform based on the conversation data with the associated one or more tags.

* * * * *